United States Patent
Sheppard et al.

(10) Patent No.: US 9,557,749 B2
(45) Date of Patent: Jan. 31, 2017

(54) VALVES FOR BYPASS CIRCUITS IN HEAT EXCHANGERS

(71) Applicant: Dana Canada Corporation, Oakville (CA)

(72) Inventors: Jeff Sheppard, Milton (CA); Gregory Pineo, Kleinburg (CA); Brian Cheadle, Brampton (CA); Yuri Peric, Split (HR)

(73) Assignee: Dana Canada Corporation, Oakville, Ontario (CA)

( * ) Notice: Subject to any disclaimer, the term of this patent is extended or adjusted under 35 U.S.C. 154(b) by 318 days.

(21) Appl. No.: 13/803,058

(22) Filed: Mar. 14, 2013

(65) Prior Publication Data
US 2014/0262200 A1    Sep. 18, 2014

(51) Int. Cl.
| F28F 27/00 | (2006.01) |
| G05D 15/00 | (2006.01) |
| F28D 7/06 | (2006.01) |
| F28F 27/02 | (2006.01) |
| G05D 23/185 | (2006.01) |
| F28D 1/03 | (2006.01) |
| G05D 23/02 | (2006.01) |
| F28D 21/00 | (2006.01) |

(52) U.S. Cl.
CPC ......... G05D 23/1852 (2013.01); F28D 1/0333 (2013.01); F28F 27/02 (2013.01); G05D 23/022 (2013.01); *F28D 2021/0089* (2013.01); *F28F 2250/06* (2013.01); *Y10T 137/87113* (2015.04)

(58) Field of Classification Search
CPC ............ G05D 23/1852; G05D 23/1333; G05D 23/1921; G05D 23/13; F28F 3/02; F28F 27/02; F28F 2250/06; F28F 13/06; F28D 1/0308; F28D 1/0316; F28D 1/0333; F01P 2007/168

USPC ........ 165/100, 102, 103, 176, 296, 297, 300
See application file for complete search history.

(56) References Cited

U.S. PATENT DOCUMENTS

| 208,986 A | 10/1878 | Patterson |
| 290,450 A | 12/1883 | Medden |
| 320,280 A | 6/1885 | Pearson |
| 417,136 A | 12/1889 | Bell |
| 424,199 A | 3/1890 | Haskell |
| 674,674 A | 5/1901 | Fernald |
| 809,603 A | 1/1906 | Barr |
| 967,820 A | 8/1910 | Nachtigall |
| 1,457,937 A | 6/1923 | Reynolds |
| 1,617,433 A | 2/1927 | Beisel |
| 1,648,124 A | 11/1927 | Hopkins |
| 1,740,420 A | 12/1929 | Friedman |
| 1,807,594 A | 6/1931 | Hopkins |

(Continued)

FOREIGN PATENT DOCUMENTS

JP    3-79637    12/1991

OTHER PUBLICATIONS

Crane Catalogue, Section 2, Bronze Valves, pp. 2-27 and 2-29, May 1961.

(Continued)

*Primary Examiner* — Allen Flanigan
*Assistant Examiner* — Jason Thompson
(74) *Attorney, Agent, or Firm* — Marshall & Melhorn, LLC

(57) ABSTRACT

A valve can be incorporated as an integral part of the heat exchanger as a plug-in item that can be located anywhere desired between the inlet and outlet flow manifolds of the heat exchanger.

4 Claims, 17 Drawing Sheets

(56) References Cited

U.S. PATENT DOCUMENTS

| | | | |
|---|---|---|---|
| 1,843,953 A | 2/1932 | McKinney | |
| 1,937,246 A | 11/1933 | Reedy | |
| 1,939,128 A | 12/1933 | Meyer | |
| 1,942,417 A | 1/1934 | Ferlin | |
| 1,991,052 A | 2/1935 | Derby | |
| 2,159,468 A | 5/1939 | Young et al. | |
| 2,396,053 A | 3/1946 | McEntire | |
| 2,433,454 A | 12/1947 | Hoffman | |
| 2,446,995 A | 8/1948 | Bay | |
| 2,469,212 A | 5/1949 | Shaw | |
| 2,865,594 A | 12/1958 | Winfree | |
| 3,034,571 A | 5/1962 | Matthews | |
| 3,145,968 A | 8/1964 | Marx | |
| 3,155,367 A | 11/1964 | Gifford | |
| 3,282,554 A | 11/1966 | Jones | |
| 3,404,837 A | 10/1968 | James | |
| 3,412,756 A | 11/1968 | Shore | |
| 3,414,232 A | 12/1968 | Hellman | |
| 3,440,833 A | 4/1969 | Fernandes | |
| 3,519,245 A | 7/1970 | Hyde | |
| 3,558,098 A | 1/1971 | Puster | |
| 3,572,631 A | 3/1971 | Ritchart | |
| 3,754,706 A | 8/1973 | Tao | |
| 3,779,306 A | 12/1973 | Wilson | |
| 3,926,204 A | 12/1975 | Earl | |
| 3,943,970 A | 3/1976 | Knapp | |
| 3,952,764 A | 4/1976 | Keller, III | |
| 4,024,909 A | 5/1977 | Hofmann, Jr. | |
| 4,056,119 A | 11/1977 | Allen | |
| 4,089,504 A | 5/1978 | Giuliani | |
| 4,114,571 A | 9/1978 | Ruf | |
| 4,401,091 A * | 8/1983 | Costello et al. | 123/557 |
| 4,432,410 A | 2/1984 | Cadars | |
| 4,469,275 A | 9/1984 | DeSalve | |
| 4,508,132 A | 4/1985 | Mayfield et al. | |
| 4,527,681 A | 7/1985 | Sommer | |
| 4,550,896 A | 11/1985 | Hansen, III | |
| 4,574,836 A | 3/1986 | Barnard, Jr. | |
| 4,669,532 A | 6/1987 | Tejima et al. | |
| 4,759,331 A | 7/1988 | Sausner | |
| 4,846,219 A | 7/1989 | Schaefer | |
| 5,085,468 A | 2/1992 | Billotte | |
| 5,101,640 A * | 4/1992 | Fukushima et al. | 62/196.4 |
| 5,108,071 A | 4/1992 | Hutchings | |
| 5,217,200 A | 6/1993 | Hutchings | |
| 5,303,734 A | 4/1994 | Eidsmore | |
| 5,305,826 A * | 4/1994 | Couetoux | 165/103 |
| 5,401,087 A | 3/1995 | Goossens | |
| 5,423,373 A | 6/1995 | Ramberg | |
| 5,425,397 A | 6/1995 | Mackal | |
| 5,474,107 A | 12/1995 | Hayes | |
| 5,551,506 A | 9/1996 | Nishishita | |
| 5,553,664 A | 9/1996 | Nishishita et al. | |
| 5,609,203 A | 3/1997 | Kinugasa et al. | |
| 5,687,756 A | 11/1997 | VanNatta | |
| 5,694,975 A | 12/1997 | Eidsmore | |
| 5,875,834 A | 3/1999 | Brooks | |
| 5,904,292 A | 5/1999 | McIntosh | |
| 5,950,589 A | 9/1999 | Armbruster | |
| 5,964,282 A | 10/1999 | Seiler et al. | |
| 5,988,265 A | 11/1999 | Marthaler | |
| 6,161,614 A | 12/2000 | Woodhull, Jr. et al. | |
| 6,253,837 B1 | 7/2001 | Seiler et al. | |
| 6,302,191 B1 | 10/2001 | Wickham et al. | |
| 6,505,812 B1 | 1/2003 | Anastas | |
| 6,533,242 B2 | 3/2003 | Geib | |
| 6,659,050 B1 | 12/2003 | Creech | |
| 6,772,958 B1 | 8/2004 | Lamb et al. | |
| 6,793,198 B2 | 9/2004 | Robison | |
| 6,810,931 B2 | 11/2004 | Graffin | |
| 6,886,597 B2 | 5/2005 | Dragoni et al. | |
| 7,178,553 B2 | 2/2007 | Peric et al. | |
| 7,487,826 B2 | 2/2009 | Pineo et al. | |
| 7,490,622 B2 | 2/2009 | Jones | |
| 7,617,700 B2 | 11/2009 | Lamb et al. | |
| 7,854,256 B2 | 12/2010 | Pineo et al. | |
| 2003/0019620 A1 * | 1/2003 | Pineo et al. | 165/297 |
| 2003/0062493 A1 | 4/2003 | Lin | |
| 2003/0197142 A1 | 10/2003 | Tawns | |
| 2011/0042060 A1 | 2/2011 | Pineo et al. | |
| 2012/0018118 A1 * | 1/2012 | Cimatti et al. | 165/41 |

OTHER PUBLICATIONS

ISA Handbook of Control Valves, 2nd Edition, pp. 14-15, Jun. 1, 1976.
Parker Fluid Connectors, Rising Stem Plug Valve, p. 13, Jul. 1994.
English abstract of JP3-79637.

* cited by examiner

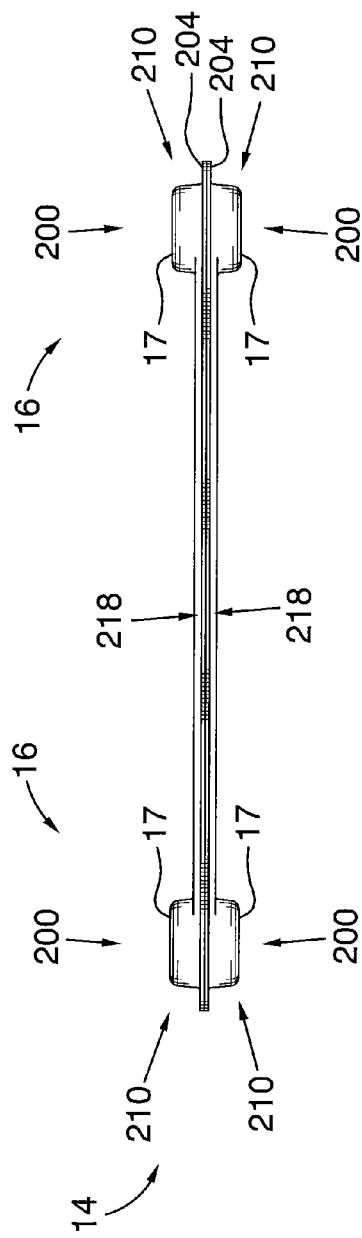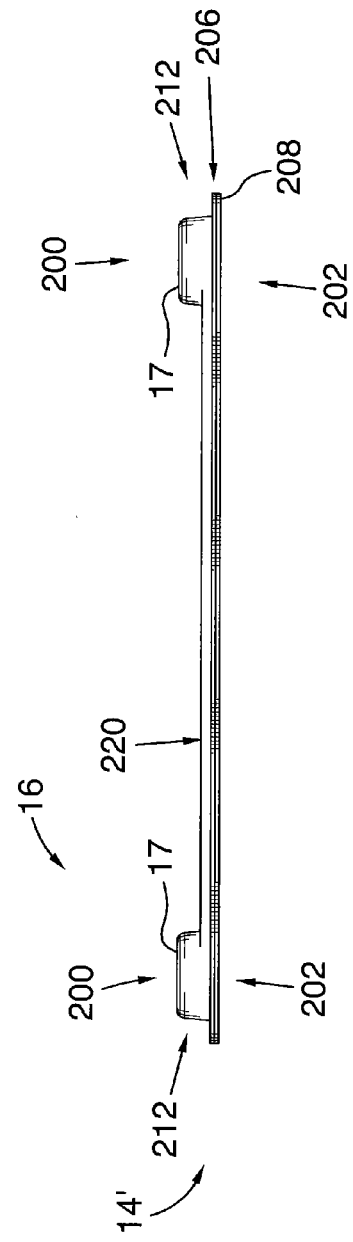

VALVES FOR BYPASS CIRCUITS IN HEAT EXCHANGERS

CROSS-REFERENCE TO RELATED APPLICATIONS

This application is a continuation-in-part of U.S. patent application Ser. No. 13/228,493 filed on Sep. 9, 2011; which is a continuation-in part application of U.S. patent application Ser. No. 12/916,710, filed on Nov. 1, 2010; which is a continuation application of U.S. patent application Ser. No. 12/335,024 filed on Dec. 15, 2008; which is a continuation-in-part of U.S. patent application Ser. No. 11/264,494, filed on Nov. 1, 2005, now U.S. Pat. No. 7,487,826, which is a continuation of U.S. patent application Ser. No. 09/918,082, filed Jul. 30, 2001, now abandoned; and this application claims priority to U.S. Patent Application Ser. No. 61/527,864 filed on Aug. 26, 2011, and U.S. Patent Application Ser. No. 61/761,968 filed on Feb. 7, 2013, wherein all of the above-mentioned applications and patents are incorporated herein by reference in their entireties, claim the benefit from and from which priority is claimed.

This invention relates to heat exchangers, and in particular, to bypass valves for bypassing or short-circuiting flow from the heat exchanger inlet to the heat exchanger outlet under conditions where the heat transfer function of the heat exchanger is not required or is only intermittently required.

FIELD OF THE INVENTION

The invention relates to the field of heat exchangers.

BACKGROUND OF THE INVENTION

In certain applications, such as in the automotive industry, heat exchangers are used to cool or heat certain fluids, such as engine oil or transmission fluid or oil. In the case of transmission fluid, for instance, a heat exchanger is usually used to cool the transmission fluid. The heat exchanger is usually located remote from the transmission and receives hot transmission fluid from the transmission through supply tubing, cools it, and delivers it back to the transmission again through return tubing. However, when the transmission is cold, such as at start-up conditions, the transmission oil is very viscous and does not flow easily through the heat exchanger, if at all. In such cases, the transmission can be starved of fluid and this may cause damage to the transmission or at least erratic performance. Damage can also be caused to the transmission if the quantity of fluid returned is adequate, but is over-cooled by the heat exchanger due to low ambient temperatures. In this case, water may accumulate in the transmission fluid as a result of condensation (which normally would be vaporized at higher temperatures) and this may cause corrosion damage or transmission fluid degradation.

In order to overcome the cold flow starvation problem, it has been proposed to insert a bypass valve between the supply and return tubing to and from the heat exchanger. This bypass valve may be temperature responsive so that it opens causing bypass flow when the transmission fluid is cold, and it closes to prevent bypass flow when the transmission fluid heats up to operating temperature. An example of such a bypass valve is shown in U.S. Pat. No. 6,253,837 issued to Thomas F. Seiler et al. While this approach works satisfactorily, the heat exchanger and bypass valve assembly becomes quite large and includes fluid inlet and outlet tubing that may not otherwise be required.

SUMMARY OF THE INVENTION

In the present invention, a valve can be incorporated as an integral part of the heat exchanger as a plug-in item that can be located anywhere desired between the inlet and outlet flow manifolds of the heat exchanger.

Forming one aspect of the invention is a heat exchanger comprising a plurality of tubular members and an anti-leakage valve. The tubular members are disposed in a stack and have spaced-apart wall portions including flow openings for the flow of fluid between the tubular members. The anti-leakage valve includes a housing, an actuator portion and an actuator.

The housing has a hollow plug portion with opposed plug walls, one of the plug walls having defined therein one of an inlet and an outlet opening, said plug portion further having defined therein the other of the inlet and outlet opening. The plug portion is disposed in the stack with the plug walls being sealingly mounted between selected ones of said spaced-apart wall portions to allow fluid flow between said inlet and outlet opening and respective flow openings in said selected ones of said spaced-apart wall portions. The actuator portion is located adjacent to the plug portion. The actuator is mounted in the actuator portion and has a plunger extending into the plug portion, the plunger reciprocating to block and unblock said one of the inlet and outlet opening.

The tubular members are formed of plate pairs having enlarged distal end portions.

According to another aspect of the invention, the heat exchanger can further comprise a bypass valve.

According to other aspects of the invention:
- the stack can include a substack immediately above the anti-leakage valve and a substack immediately below the anti-leakage valve
- the enlarged distal end portions can be joined together to form,
  - at one end of the stack, adjacent manifolds associated one with the substack above the anti-leakage valve and one with the substack below the anti-leakage valve, the manifolds being fluidly coupled to one another via the bypass valve, so that fluid can flow between the manifolds when the flow through the bypass valve is unblocked
  - at the other end of the stack, adjacent manifolds associated one with the substack above the anti-leakage valve and one with the substack below the anti-leakage valve, the manifolds being fluidly coupled to one another via the anti-leakage valve, so that fluid can flow between the manifolds when the flow through the anti-leakage valve is unblocked
- the anti-leakage valve and the bypass valve can be adapted such that, when the bypass valve is unblocked, the anti-leakage valve is blocked, and such that, when the bypass valve is blocked, the anti-leakage valve is unblocked.

According to another aspect of the invention, said selected ones of said spaced-apart wall portions can be formed in the distal end portions of an adjacent plate pair from each of the adjacent manifolds coupled together by the anti-leakage valve.

According to another aspect of the invention, the bypass valve can include:
  a housing having a hollow plug portion with opposed plug walls, one of the plug walls having defined therein one of an inlet and an outlet opening, said plug portion further having defined therein the other of the inlet and outlet opening; said plug portion being disposed in the stack with the plug walls being sealingly mounted between selected ones of said spaced-apart wall portions to allow fluid flow between said inlet and outlet opening and respective flow openings in said selected ones of said spaced-apart wall portions;

an actuator portion located adjacent to the plug portion; and an actuator mounted in the actuator portion and having a plunger extending into the plug portion, the plunger reciprocating to block and unblock said one of the inlet and outlet opening.

According to another aspect of the invention, said selected ones of said spaced-apart wall portions can be formed in the distal end portions of an adjacent plate pair from each of the adjacent manifolds coupled together by the bypass valve.

According to another aspect of the invention, the plungers of the bypass valve and the anti-leakage valve can be coupled together by a rod, the rod defining one of the actuators, the other of the actuators being a temperature responsive actuator.

According to another aspect of the invention, the temperature responsive actuator can be a thermal motor.

According to another aspect of the invention, each of the actuators can be defined by a respective temperature responsive actuator.

According to another aspect of the invention, each of the actuators can be defined by a respective thermal motor.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter being briefly described hereinafter.

BRIEF DESCRIPTION OF THE DRAWINGS

Exemplary embodiments of the invention will now be described by way of example, with reference to the accompanying drawings, in which:

FIG. 11 is a view of a portion of FIG. 10;

FIG. 12 is a view of another portion of FIG. 10;

DESCRIPTION OF THE EXEMPLARY EMBODIMENTS

Figure 1:
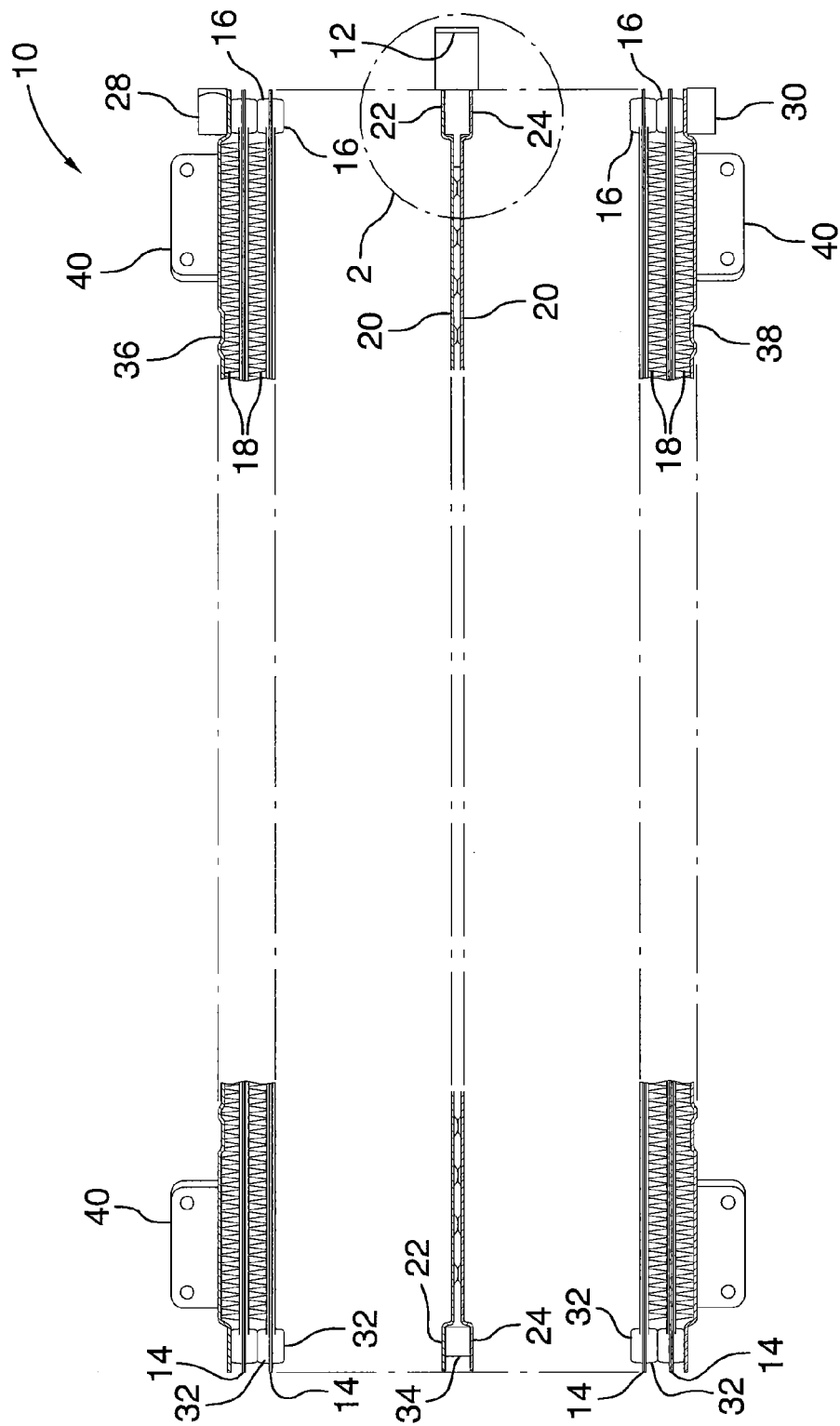
FIG. 1 is an elevational view of a heat exchanger having an exemplary embodiment of a bypass valve according to the present invention mounted therein.
Figure 2:
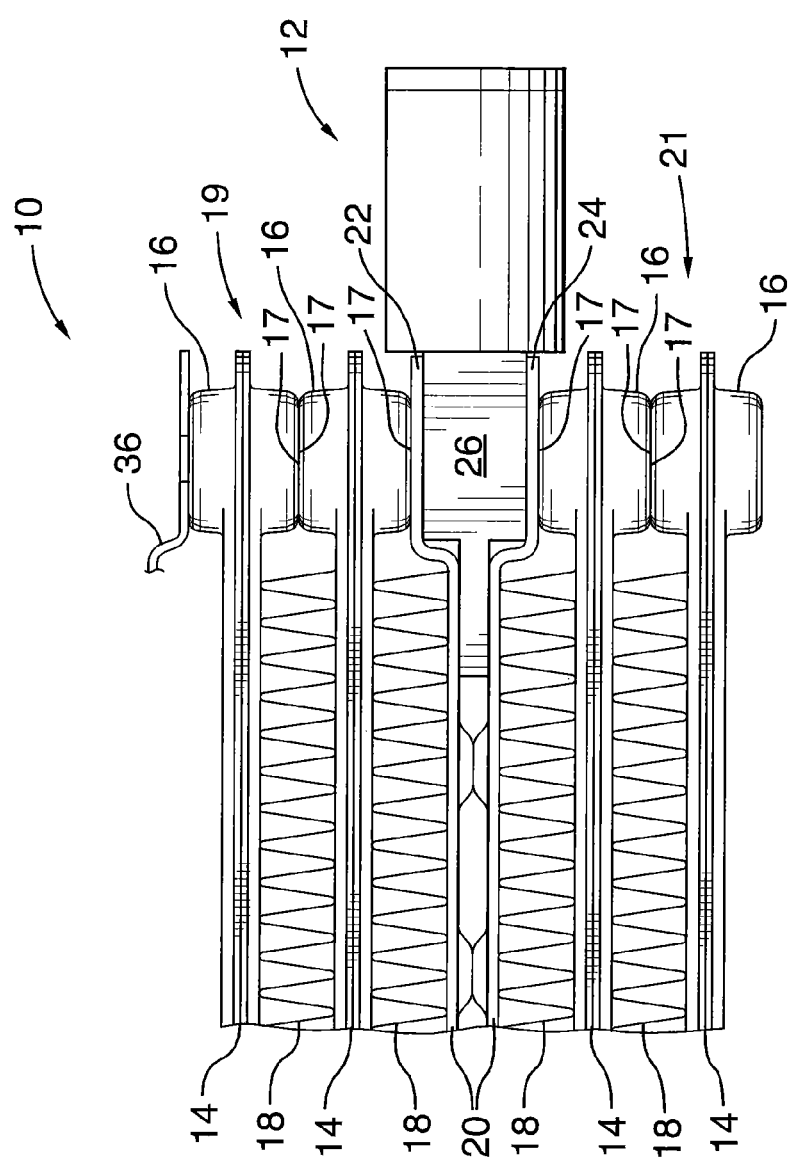
FIG. 2 is an enlarged view of the portion of FIG. 1 indicated by circle 2.

Referring firstly to FIGS. 1 and 2, a heat exchanger is generally indicated by reference in 10, and an exemplary embodiment of a bypass valve according to the present invention is generally indicated by reference numeral 12. Heat exchanger 10 is formed of a plurality of parallel, spaced-apart, tubular members 14 preferably with enlarged distal end portions 16 that have adjacent wall portions 17 defining flow openings (not shown) in communication. Tubular members 14 are preferably formed of mating plate pairs with transversely protruding cupped end portions to form these enlarged end portions 16 that also together form flow manifolds 19 and 21. However, tubular members 14 could be formed of tubes with separate joined enlarged end portions 16, if desired. Alternatively, tubular members of uniform width or thickness could be used, in which case tubular spacers could be used between the tube ends in place of enlarged distal end portions 16. If it is not necessary to space tubular members 14 apart transversely, then such spacers would not be required. Yet another possibility would be to use transversely orientated tubular manifolds 19 and 21 attached in communication with the ends of tubular members 14. For the purpose of this disclosure, the term "distal end portions" is intended to include all of the above-mentioned tube member communicating wall structures. Corrugated cooling fins 18 are located between the tubular members 14 where the tubular members 14 are spaced apart transversely.

In the heat exchangers shown in FIGS. 1 and 2, the tubular members 14 are formed into two upper and lower groups separated by central back-to-back dimpled plates 20 having offset end portions 22, 24. As seen best in FIG. 2, the space between offset end portions 22, 24 provides a location where bypass valve 12 can be plugged into heat exchanger 10. Bypass valve 12 includes a hollow plug portion 26 located in this space, described in further detail below.

As mentioned above, the enlarged distal end portions 16 have transverse openings therethrough (not shown), so that the distal end portions 16 located above bypass valve 12 are all in communication and form either an inlet or an outlet manifold 19 depending on the direction in which fluid is to flow through heat exchanger 10. Similarly, the enlarged distal end portions 16 located below bypass valve 12 are all in communication and form a respective outlet or inlet manifold 21. As seen best in FIG. 1, an inlet or outlet fitting 28 communicates with the enlarged distal end portions below it and an inlet or outlet fitting 30 communicates with the enlarged distal end portions above it. So, for example, fluid entering inlet fitting 28 travels from right to left as shown in FIG. 1 through all of the tubular members 14 located above dimpled plates 20, to a similar left hand manifold formed by enlarged distal end portions 32, and then downwardly through a crossover fitting 34 into a left hand manifold in the lower section of heat exchanger 10 formed by enlarged distal end portions 32, and then back to the right end and out through outlet fitting 30. Heat exchanger 10 is thus called a two-pass heat exchanger and can have any number of tubular members 14 above or below the dimpled plates 20. In fact, there could just be one tubular member 14 above or below dimpled plates 20, as illustrated in the embodiment shown in FIG. 9 and as described further below.

Heat exchanger 10 also has upper and lower dimpled plates 36 and 38. Suitable mounting brackets 40 are attached to dimpled plates 36, 38 as are the inlet and outlet fittings 28, 30.

Figure 3:
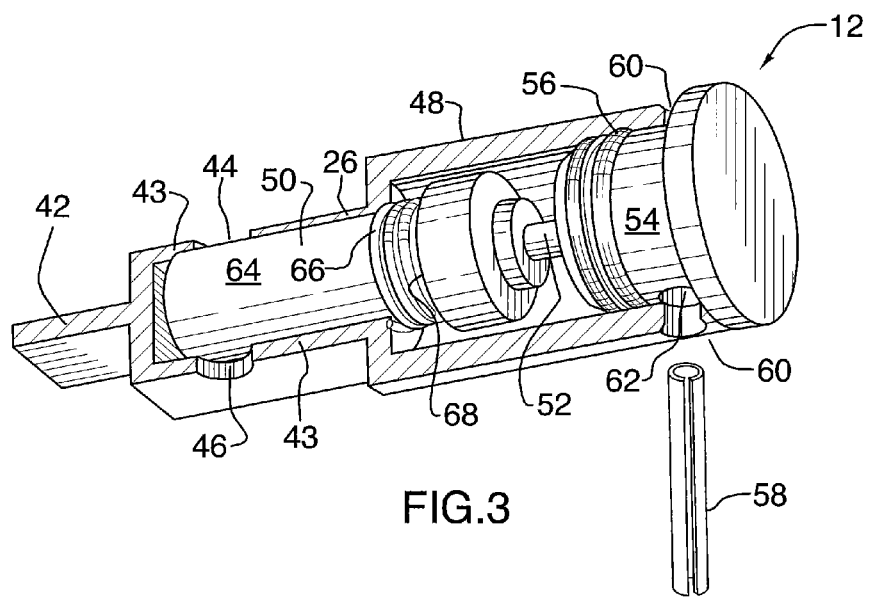
FIG. 3 is a perspective view, partly broken away of the bypass valve of FIG. 2 shown in the closed position.
Figure 4:
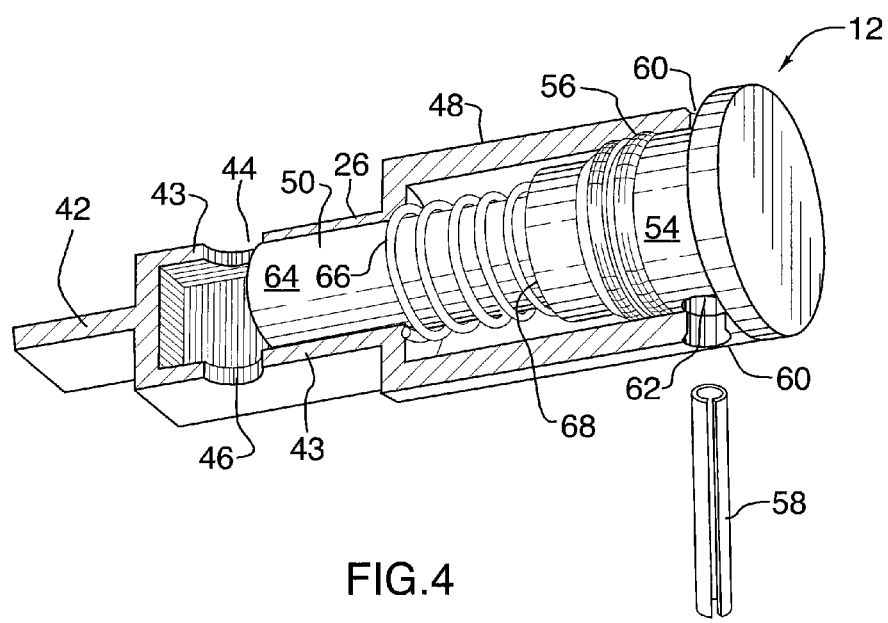
FIG. 4 is a perspective view similar to FIG. 3 but showing the bypass valve in the open position.

Referring next to FIGS. 3 and 4, bypass valve 12 includes a housing 42 having a hollow plug portion 26 with spaced-apart, opposed, flat, parallel plug side walls 43 defining transversely located inlet and outlet openings 44, 46 formed therein for the flow of fluid through plug portion 26 when valve 12 is in the open position as shown in FIG. 4. Plug walls 43 are sealingly mounted between selected adjacent tubular member wall portions 17 of the enlarged distal end portions 16 of tubular members 14. The distal end portions 16 have flat mating surfaces. The offset end portions 22 mate flush against their adjacent distal end portion flat surfaces and the flat housing side walls 43 mate flush against the flat offset end portions 22. However, housing side or plug walls 43 would mate flush against the flat portions of distal end portions 16, if dimpled plates 22 were not used in heat exchanger 10. This mounting allows bypass fluid flow directly between selected distal end portions 16, or respectively between the flow manifolds 19 and 21 and the inlet and outlet openings 44 and 46, or between the inlet and outlet fittings 28, 30 when bypass valve 12 is open. Bypass valve side or plug walls 43 are spaced apart a predetermined distance so as to determine the spacing between adjacent heat exchanger tubular members, especially if dimpled plates 20 are not used.

Bypass valve housing 42 also has an actuator portion 48 located adjacent to and communicating with plug portion 26. A temperature responsive actuator 50 is located in housing 42. Actuator 50 has a central shaft 52 attached to a removable closure 54 located remote from plug portion 26. Removable closure 54 has an O-ring seal 56 and is held in position by a split pin 58 passing through openings 60 in actuator portion 40 and a through hole 62 in closure 54.

Temperature responsive actuator 50 has a reciprocating barrel portion 64 which forms a plunger slidably located in housing plug portion 26 to block and unblock flow between inlet and outlet openings 44, 46. A spring 66 is located in housing actuator portion 48 and bears against an annular shoulder 68 on barrel 64 to act as bias means to urge the actuator 50 to retract so that barrel or plunger 64 unblocks the flow of fluid through inlet and outlet openings 44, 46 of bypass valve 12, when the actuator is not extended due to temperature, as described next below.

Temperature responsive actuator 50 is sometimes referred to as a thermal motor and it is a piston and cylinder type device. Barrel or plunger 64 is filled with a thermal sensitive material, such as wax, that expands and contracts, causing the actuator to extend axially upon being heated to a predetermined temperature and to retract upon being cooled below this predetermined temperature. Where bypass valve 12 is used in conjunction with an automotive transmission fluid or oil cooler, this predetermined temperature is about 80° C., which is the temperature of the fluid from the transmission when bypass flow is no longer required.

Figure 5:
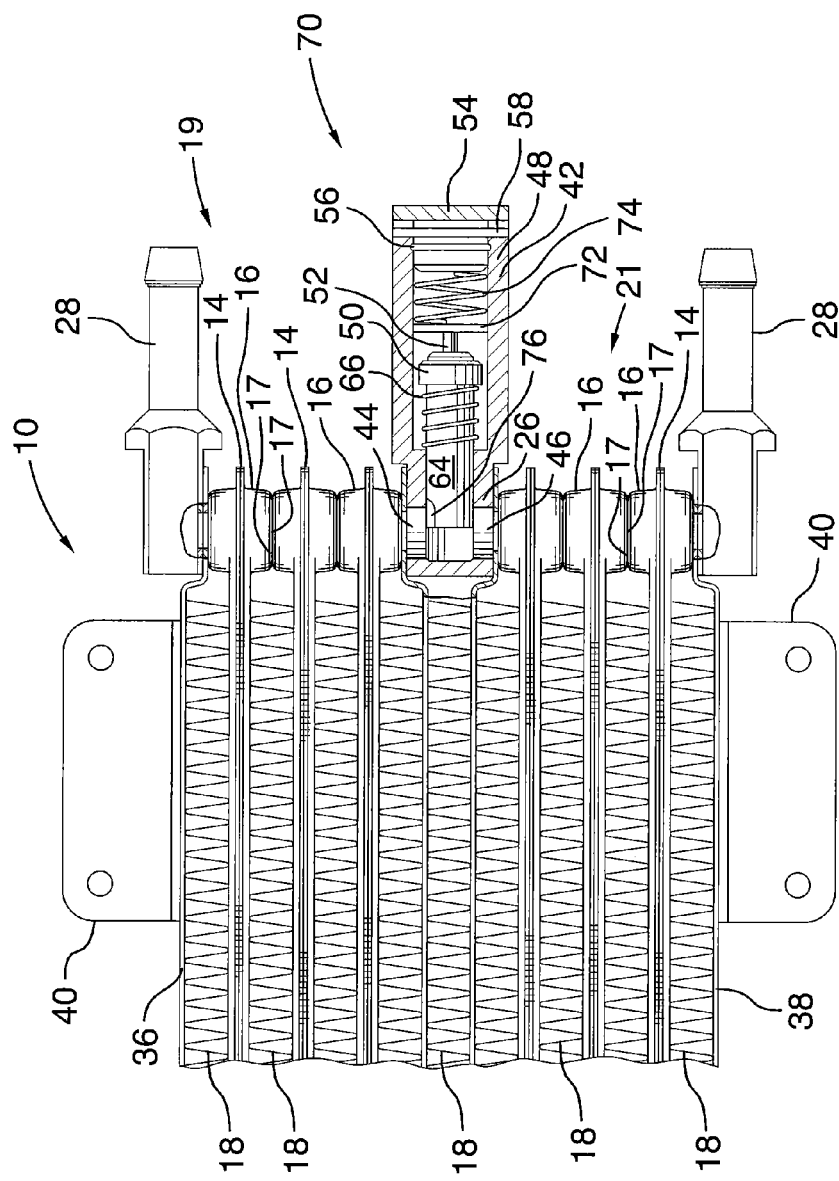
FIG. 5 is an elevational view similar to FIG. 2, but showing another exemplary embodiment of a heat exchanger and integrated bypass valve according to the present invention, the valve being shown partially in cross-section.

Referring next to FIG. 5, another exemplary embodiment of a bypass valve according to the present invention is generally indicated by reference numeral 70. Bypass valve 70 is similar to bypass valve 12 except that a sliding plate 72 bears against central shaft 52 and a spring 74 is located in housing actuator portion 48 to urge central shaft 52 toward the housing plug portion 26. Spring 74 absorbs any pressure spikes or peeks that may occur in the inlet and outlet manifolds of heat exchanger 10. A notch 76 is formed in barrel 64 to allow the fluid to act against the end of barrel 64 and provide this pressure relief even when bypass valve 70 is closed. A bleed hole through plunger or barrel 64 communicating with inlet opening 44 could also be used in place of notch 76 for this purpose. Otherwise, bypass valve 70 is substantially the same as bypass valve 12. FIG. 5 is also notable in that it shows a heat exchanger construction wherein dimpled stepped plates are not used; in this embodiment, a cooling fin is used to fill the space between the plates that mate with the valve housing, for both structural and performance reasons. This embodiment avoids the need for the valve housing to have a tab protrusion as shown in some other embodiments.

Figure 6:
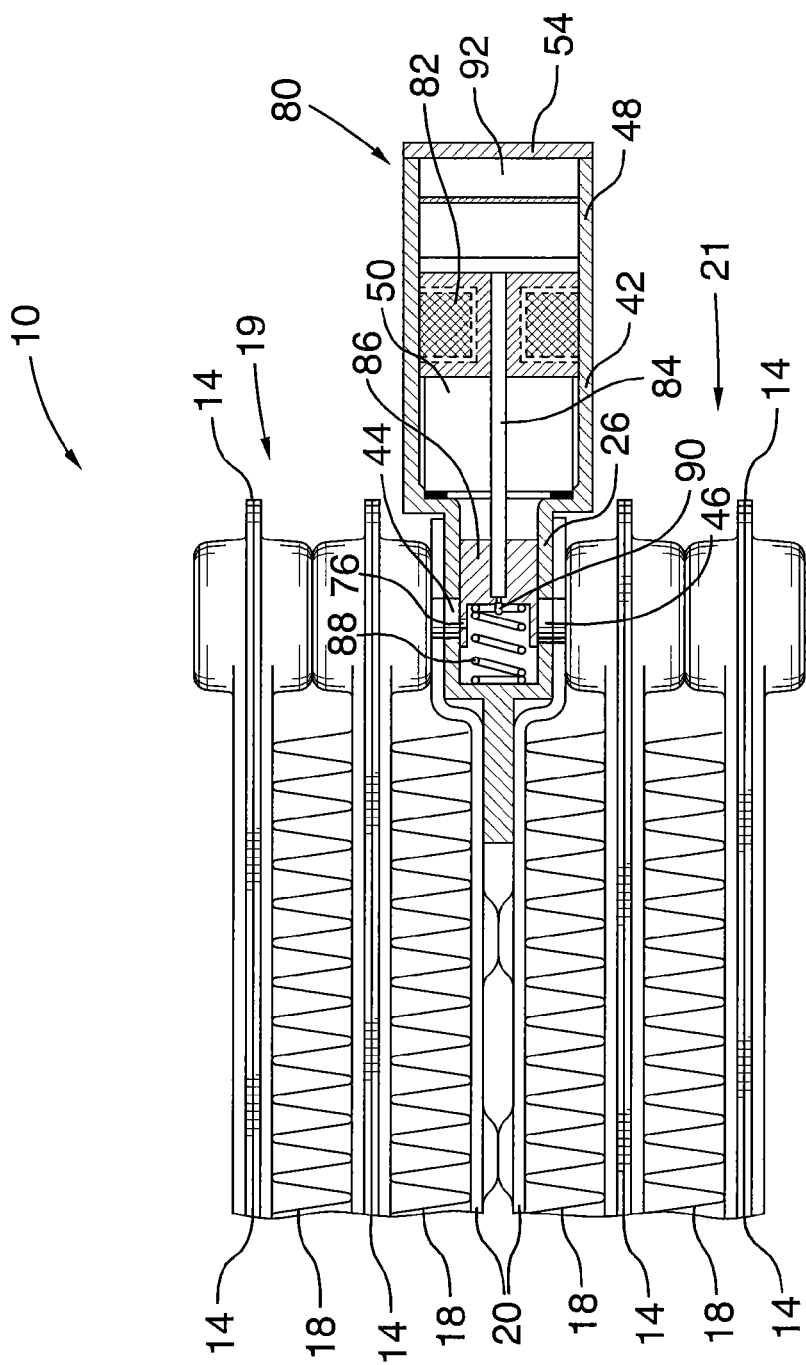
FIG. 6 is an elevational view similar to FIG. 2, yet showing another exemplary embodiment of a bypass valve according to the present invention, the valve being shown in cross-section and in the closed position.
Figure 7:
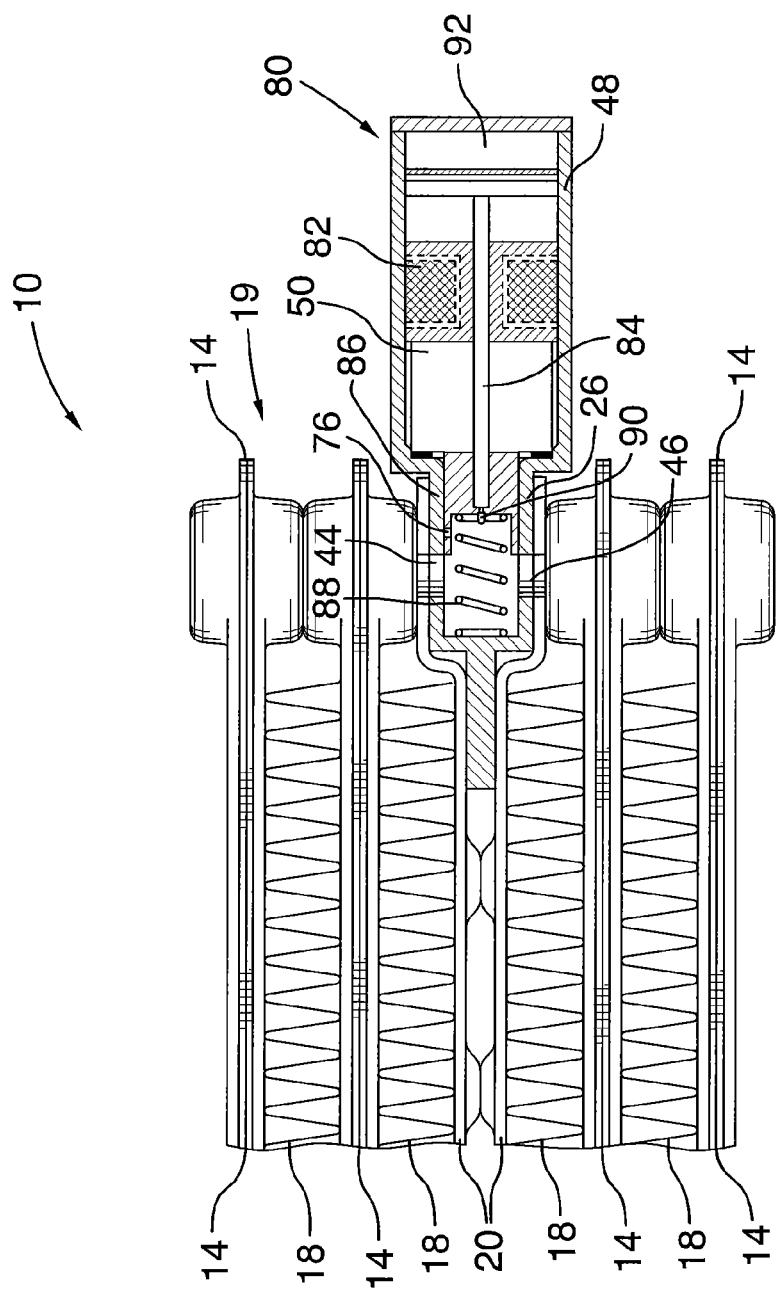
FIG. 7 is an elevational view similar to FIG. 6, but showing the bypass valve of FIG. 6 in the open position.

Referring next to FIGS. 6 and 7, another exemplary embodiment of a bypass valve according to the present invention is generally indicated by reference numeral 80. In bypass valve 80, the temperature responsive actuator 50 includes a solenoid having a solenoid coil 82 and a central actuator shaft 84 attached to a plunger 86. Plunger 86 also has a notch or bleed hole 76 to provide pressure spike relief when valve 80 is closed. Actuator shaft 84 extends upon energization of solenoid coil 82, so that plunger 86 blocks flow between the housing inlet and outlet openings 44, 46. A spring 88 located in housing plug portion 26 bears against plunger 86 to act as bias means for urging the actuator shaft 84 to retract upon the de-energization of solenoid coil 82.

A temperature sensor 90 is attached to plunger 86 and is in the form of a thermistor electrically coupled to solenoid coil 82 for actuation of the solenoid coil when the temperature of the fluid going through heat exchanger 10 reaches a predetermined temperature. Temperature sensor 90 could be located elsewhere in bypass valve 80, or even elsewhere in heat exchanger 10. Temperature sensor 90 can be electrically connected to an electrical control circuit 92 mounted in housing actuator portion 48. Electrical control circuit 92 is in turn is electrically connected to solenoid coil 82 for controlling the movement of plunger 86 in accordance with the temperature sensed by temperature sensor 90. In this way, the opening of bypass valve 80 could be controlled to provide variable opening, rather than a simple on or off, but the latter is also possible.

Figure 8:
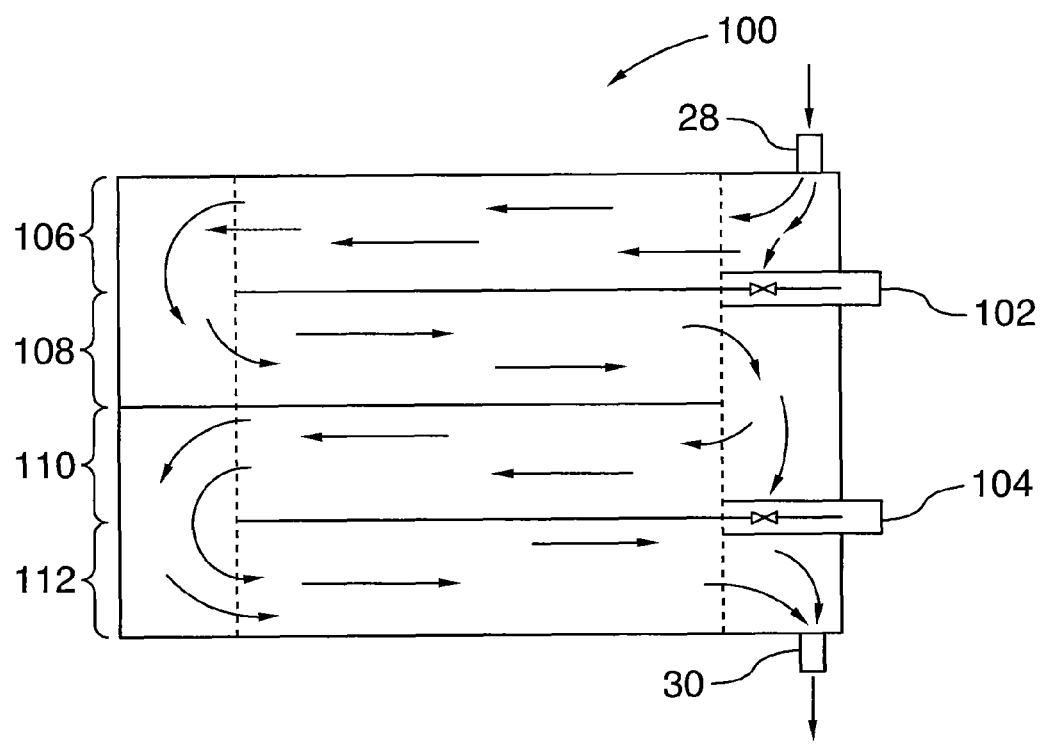
FIG. 8 is a schematic view of a heat exchanger having multiple passes and more than one bypass valve.

Referring next to FIG. 8, a heat exchanger 100 is shown schematically and it is like two heat exchangers 10 of FIG. 1 mounted in series. Two bypass valves 102, 104 are used to provide thermal modulation of the fluid flowing through the heat exchanger 100. Bypass valve 102 may have a predetermined temperature set point or activation temperature, and bypass valve 104 may have a somewhat higher temperature set point or activation temperature. Heat exchanger 100 is a four pass heat exchanger having four groups or stacks 106, 108, 110 and 112 of tubular members.

Where both bypass valves 102 and 104 are open, such as during cold flow operation, there is full fluid bypass from inlet fitting 28 to outlet fitting 30. Where bypass valve 102 is closed and valve 104 is open, such as during warm up or an interim temperature of fluid flowing through heat exchanger 100, there would be fluid flow through the top two passes 106 and 108 of heat exchanger 100, but passes 110 and 112 would be bypassed through bypass valve 104. Where the fluid reaches its hot operating temperature, both bypass valves 102 and 104 would close giving flow through all four passes 106, 108, 110 and 112 and no bypass flow at all. Additional multiples of passes and bypass valves could be used in a single heat exchanger as well. Any of the types of bypass valves described above could be used in heat exchanger 100.

Figure 9:
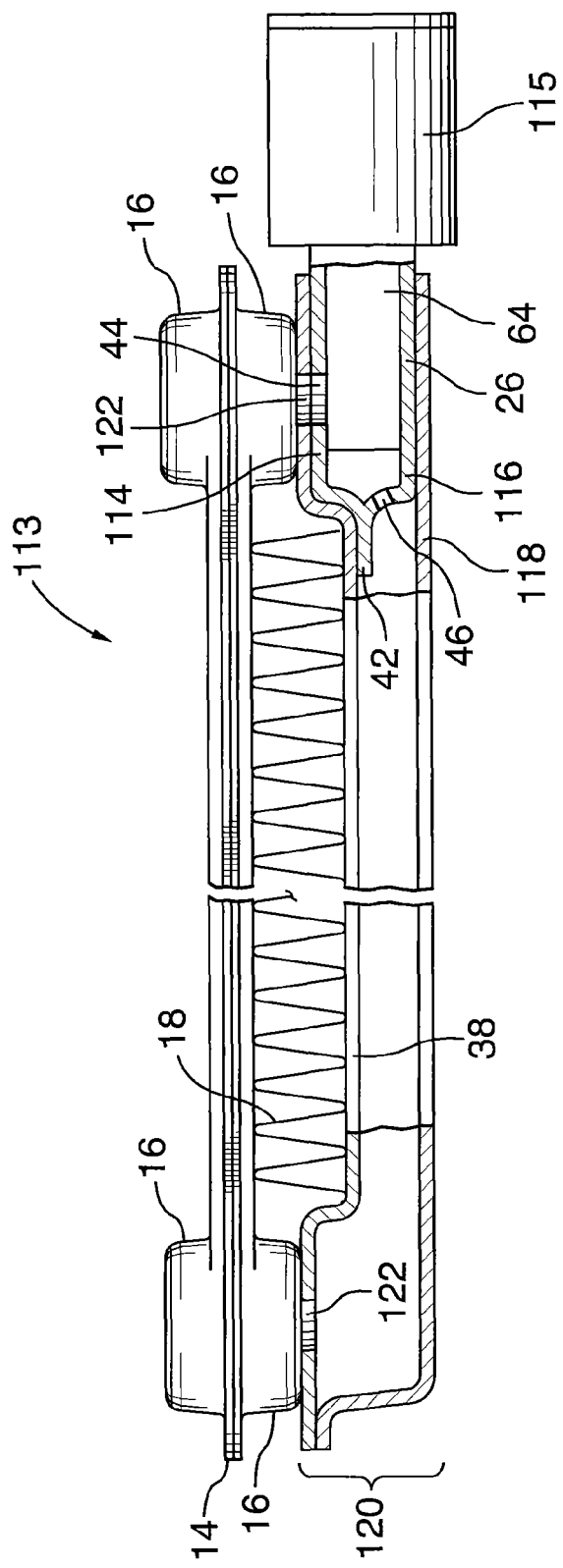
FIG. 9 is an elevational view of a portion of another exemplary embodiment of a heat exchanger and bypass valve according to the present invention.

Referring next to FIG. 9, other embodiments of a heat exchanger 113 and a bypass valve 115 are shown. In bypass valve 115, inlet and outlet openings 44, 46 are formed in opposed plug walls 114, 116 and this shows that inlet and outlet openings 44, 46 can be located anywhere in plug portion 26 as long as one of these openings is blocked when valve 115 is closed. Otherwise, bypass valve 115 is substantially similar to or can incorporate the features of the bypass valves 12, 70 and 80 described above. In the embodiment of FIG. 9, plate 38 (which preferably is dimpled but may be flat) and a bottom plate 118 (which may also be dimpled or flat), together form a tubular member 120 which is one of the tubular members that make up heat exchanger 113. Tubular member 120 is actually a bypass channel and has flow openings 122 that communicate with the flow openings in the adjacent enlarged distal end portions 16 of adjacent tubular member 14, and as such forms part of the inlet and outlet manifolds of heat exchanger 113. Instead of tubular member 120, a regular member 14 could be used in heat exchanger 113, if desired, to produce a full flood or single pass heat exchanger. Tubular members 14 may or may not have turbulizers in them or be made of dimpled plates. Bottom member 120 likely would not need to be turbulized or have other types of flow augmentation, given the preference to maintain low flow resistance in this channel during bypass operation; however features such as coarsely spaced fins, dimples or ribs might be provided mainly for structural reasons.

In the assembly of heat exchangers 10, 100 and 113, the various components, such as the tubular members 14 or 120 and fins 18 are stacked together along with dimpled plates 20, if desired, and upper and lower dimpled plates 36, 38. Mounting plates or brackets 40 and inlet and outlet fittings 28, 30 can be preassembled to upper and lower dimpled plates 36, 38, or assembled along with all of the other components. The housing 42 of the preferred bypass valve 12, 70, 80 or 115 (without any other bypass valve components) is then placed in the desired location in the heat exchanger and the entire assembly is brazed together in a brazing furnace. It will be appreciated that in the preferred embodiments, aluminum or a brazing-clad aluminum is used for most of the parts of the heat exchangers, so that all of the parts can be brazed together in one step in a brazing furnace. After this assembly is cooled, the desired actuator components of the bypass valves are inserted into housing 42 and the removable closures 54 are secured in position with split pins 58.

Figure 10:
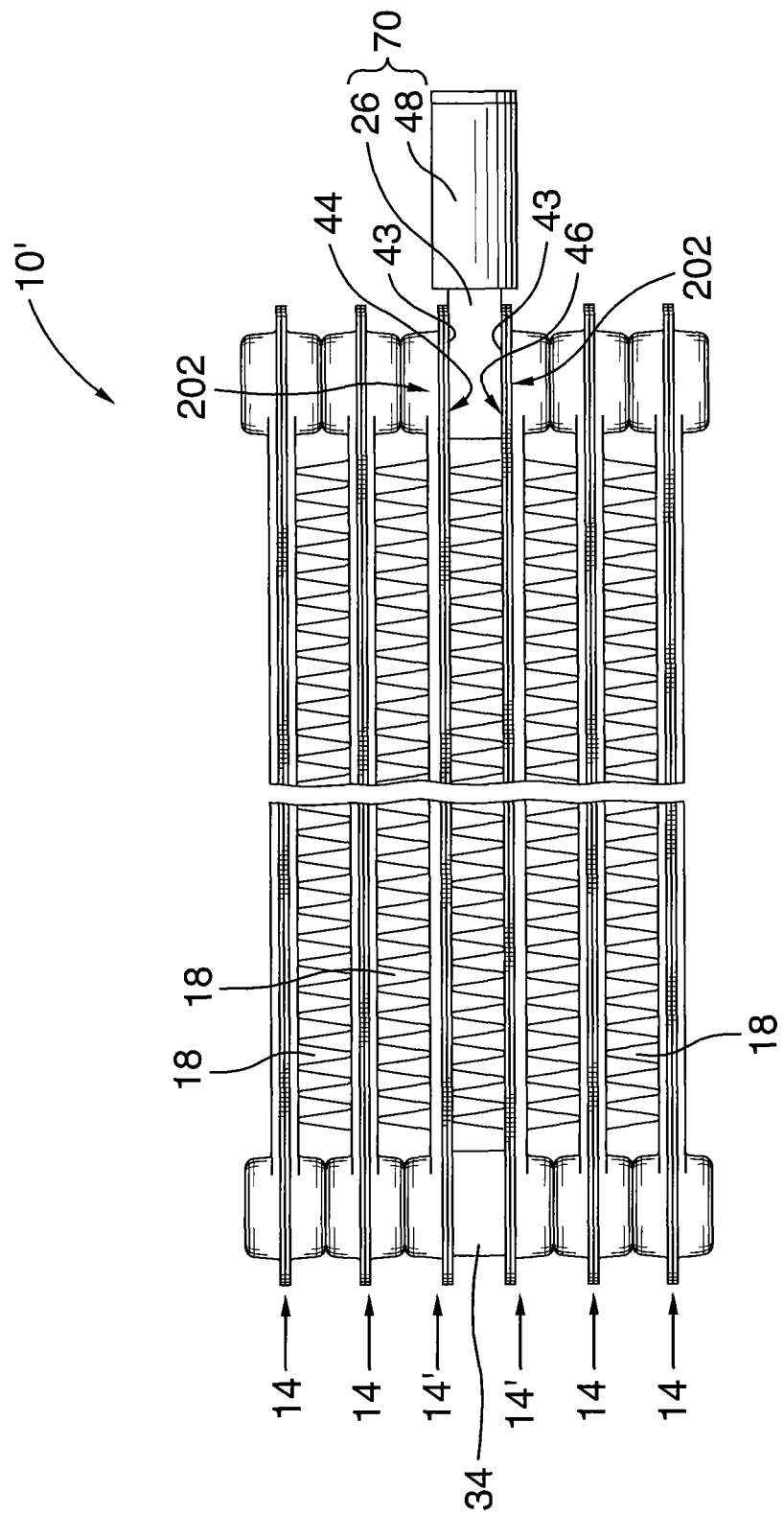
FIG. 10 is a view, similar to FIG. 2, of another exemplary embodiment of a heat exchanger and bypass valve according to the present invention.
Figure 13:
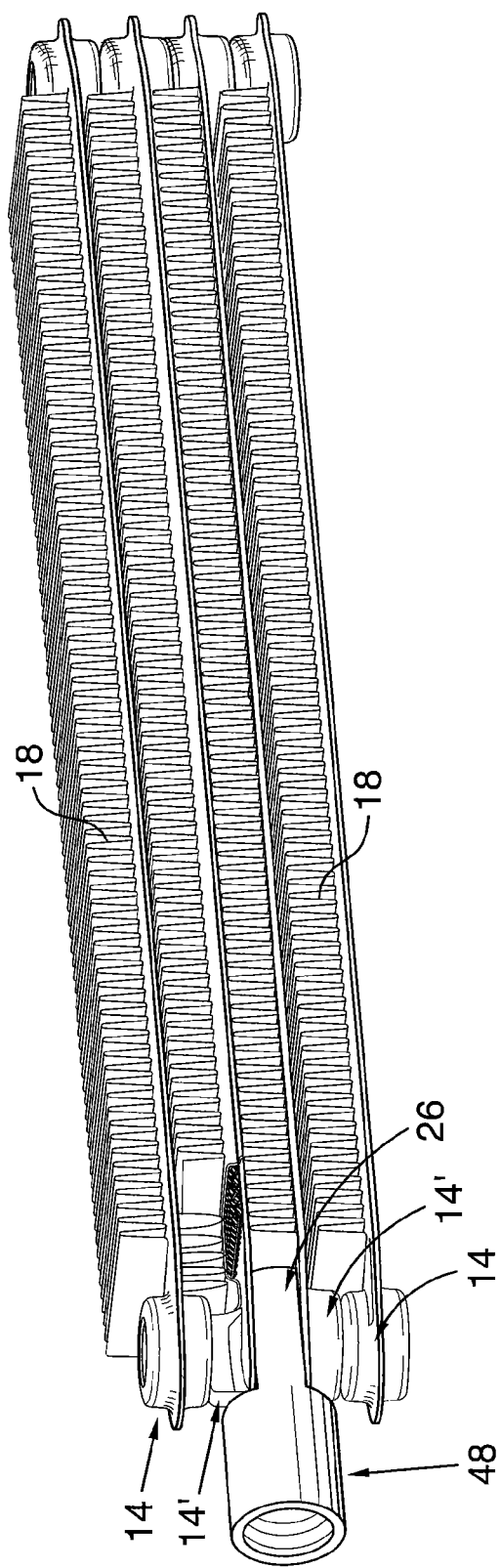
FIG. 13 is a perspective view of a portion of the heat exchanger of FIG. 10.
Figure 14:
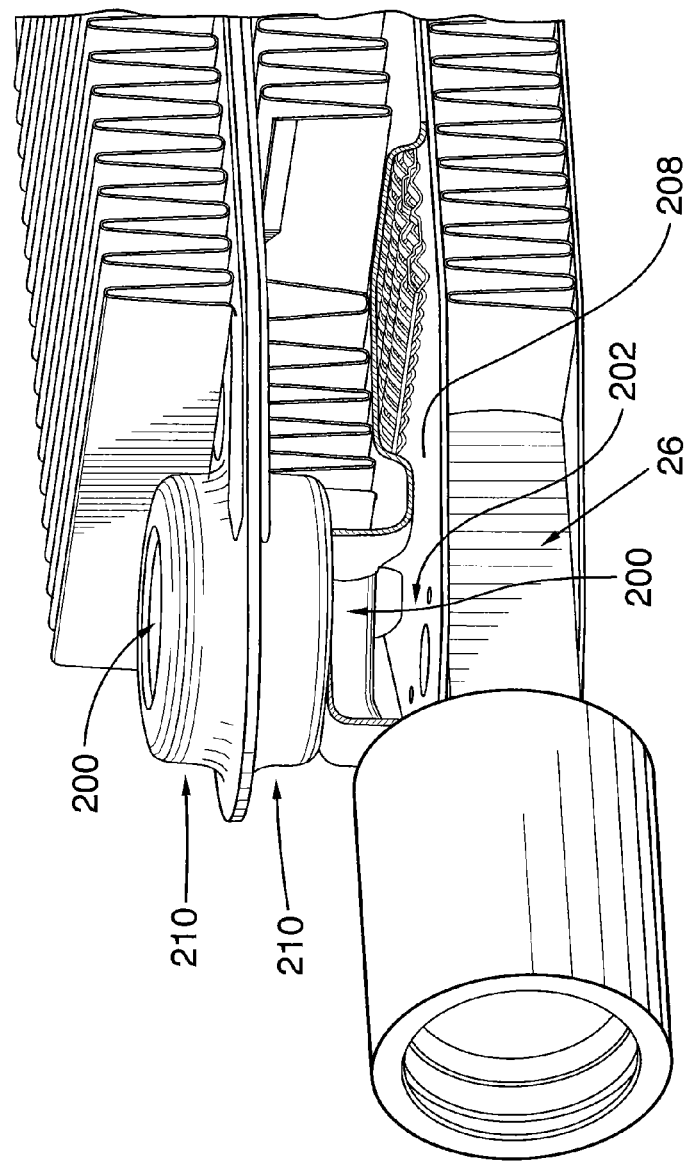
FIG. 14 is an enlarged view of a portion of FIG. 13.

A yet further exemplary embodiment of the invention is shown in FIGS. 10-14. With reference to FIG. 10, this heat exchanger 10' includes a plurality of fins 18, a plurality of tubular members 14, 14' a bypass valve 70 and a crossover fitting 34.

The fins 18 are of the general type shown, for example, in FIG. 2, are in disposed in stacked, spaced relation to one another.

The tubular members 14, 14' are arranged in a stack, with the fins 18 interleaved therebetween in alternating relation and consist of a plurality of standard tubes 14 and a pair of adapter tubes 14'.

The standard tubes 14 are of the general type shown, for example, in FIG. 2 and, as shown in FIG. 11, have enlarged distal end portions 16 that have adjacent spaced apart wall portions 17 defining flow openings 200 for the flow of fluid between adjacent tubular members in the stack.

The adapter tubes 14' are disposed in stacked relation to one another and between a respective pair of the standard tubes 14. Each adapter tube 14' has, as best seen in FIG. 12, at each end thereof: (i) a wall portion 17 including a flow opening 200; and (ii) a flow passage 202.

The adapter tubes forming said pair are, at one end, operatively connected to one another via the crossover fitting 34 such that the flow passages 202 thereof communicate with one another and are also connected to the respective pair of standard tubes 14 between which said pair of adapter tubes 14' is disposed such that the flow openings 200 in said one end of the pair of adapter tubes 14' communicate with the flow openings 200 in the standard tubes 14 between which said pair of adapter tubes 14' is disposed. At the other end, the adapter tubes are connected to the pair of standard tubes between which said pair of adapter tubes is disposed such that the flow openings 200 in said other end of the pair of adapter tubes communicate with the flow openings 200 in the standard tubes 14.

The bypass valve 70 is of the general type shown in FIG. 5 and includes, inter alia, a housing 26,48 and an actuator 50 (shown in FIG. 5).

The housing includes a hollow plug portion 26 and an actuator portion 48.

The hollow plug portion 26:
  has opposed plug walls 43, one of the plug walls having defined therein one of an inlet 44 and an outlet 46 opening and the other of the inlet and outlet opening also being defined in the plug portion; and
  is disposed with the plug walls 43 sealingly mounted between the other ends of the pair of adapter tubes such that the inlet 44 and outlet 46 openings communicate with the flow passages 202.

The actuator portion 48 is located adjacent to the plug portion 26.

The actuator 50 is mounted in the actuator portion and has a plunger [shown in FIG. 5] extending into the plug portion 26, the plunger working in a manner similar to that previously discussed, i.e. reciprocating in use to selectively:
  block at least said one of the inlet and outlet opening, to arrest flow between the other ends of the adapter tubes 14'; and
  unblock said at least said one of the inlet and outlet opening, to provide for the flow of fluid between the other ends of the adapter tubes 14' via the plug portion 26.

In terms of the details of construction and with reference to FIGS. 11 and 12, in this exemplary embodiment:
  each standard tube 14 is formed of a pair of standard plates 204 arranged in stacked relation to one another each adapter tube 14' is defined by an adapter plate 206 and a plug-receiving plate 208 arranged in stacked relation to one another each standard tube 14 has enlarged distal end portions defined by raised bosses 210 in the standard plates;

each end of each adapter plate 206 has an oversized raised boss 212;

the plug receiving plate 208 is a substantially flat plate each standard plate has a channel 218 extending between the raised bosses 210 each adapter plate 206 has an oversized channel 220 extending between the oversized raised bosses 212

This allows for relatively inexpensive construction; the various components can be stamped and then brazed together in a conventional manner, as discussed in more detail in previous passages.

Figure 15:
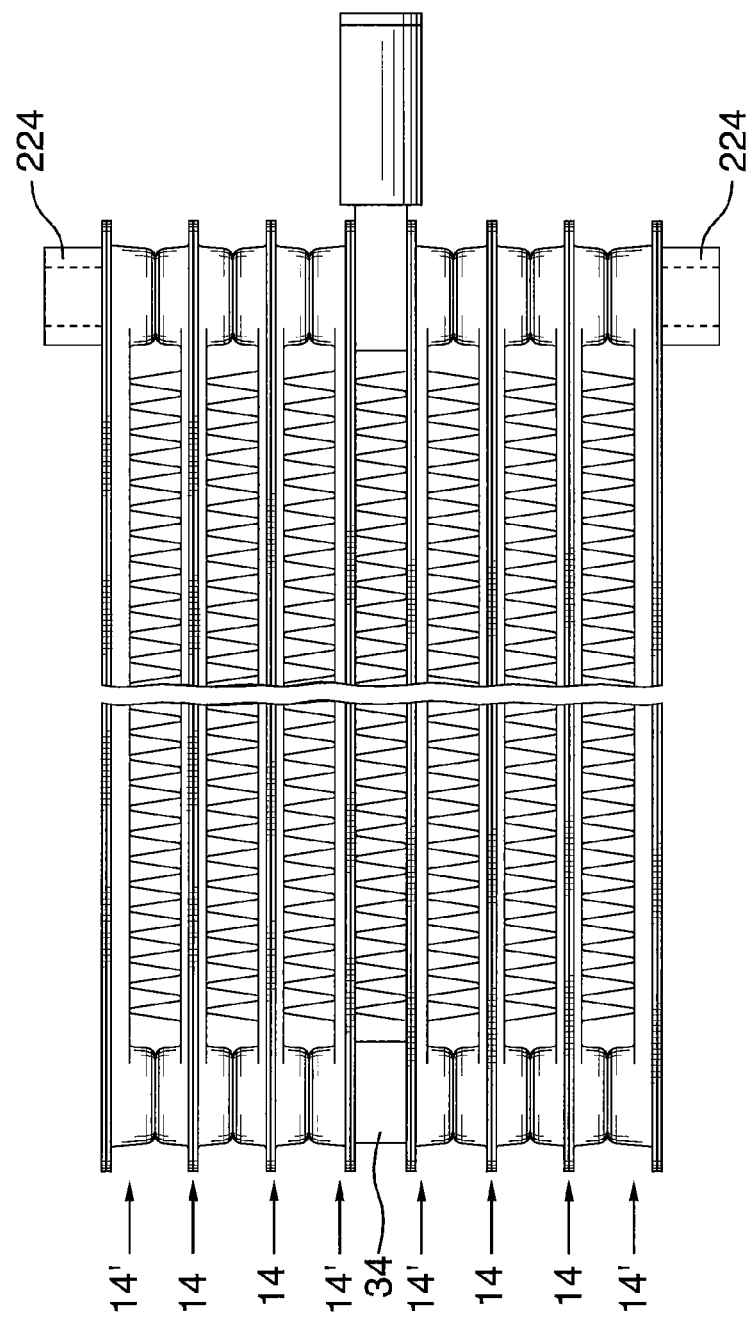
FIG. 15 is a view, similar to FIG. 10, of another exemplary embodiment.

FIG. 15 shows that adapter tubes 214' can also be used with advantage in association with the structure of FIG. 10 to permit the use of large diameter (flow passage) fittings. By way of background, it will be seen, for example, in FIG. 1 that fittings 28, 30 are constrained in girth by the step formations in dimpled plates 36,38. That are used to accommodate a standard height fin in the upper and lowermost rows, To avoid this, adapter tubes 14' can be used to define the outermost tubular members in the stack; with this structure, the larger end of the cupped manifold is presented against the mating end plate, so that fittings 224 of substantially greater flow passage girth can be brazed to flat plates 222.

Having described preferred embodiments of the invention, it will be appreciated that various modifications can be made to the structures described above. For example, instead of using a thermal motor or solenoid type actuator for the bypass valves, other devices could be used as well, such as a bimetallic helix to move the barrel or plunger of the valve. The tubular members can also have shapes or configurations, as can the turbulizers, which can also be omitted.

From the above, it will be appreciated that the bypass valves of the present invention are in the form of plugs that can be plugged in at any desired location in the heat exchanger with a simple rearrangement of the location of some components. The bypass valve housings actually act as a form of baffle plate to intermittently block flow between manifold portions of the heat exchangers. In fact, the bypass valves could be plugged in anywhere in the heat exchangers where it is desired to have bypass flow between the plate pairs or tubes. The bypass valve housings are brazed in place along with all of the other heat exchanger components. The actual valve elements in the actuators are then removably or releasably located in the bypass valve housings to complete the assembly. No external tubing or peripheral components are required to make the actuator valves active Reference is now made to FIGS. 16-18, which show heat exchangers 300, 400 according to two further embodiments of the invention. These heat exchangers will be seen to be labelled with many of the reference numerals associated with the heat exchanger discussed above, and will be understood to function in a generally similar fashion. Accordingly, a detailed description of the operation and manufacture of these heat exchangers is neither provided nor required, except to the extent that they differ.

Figure 16:
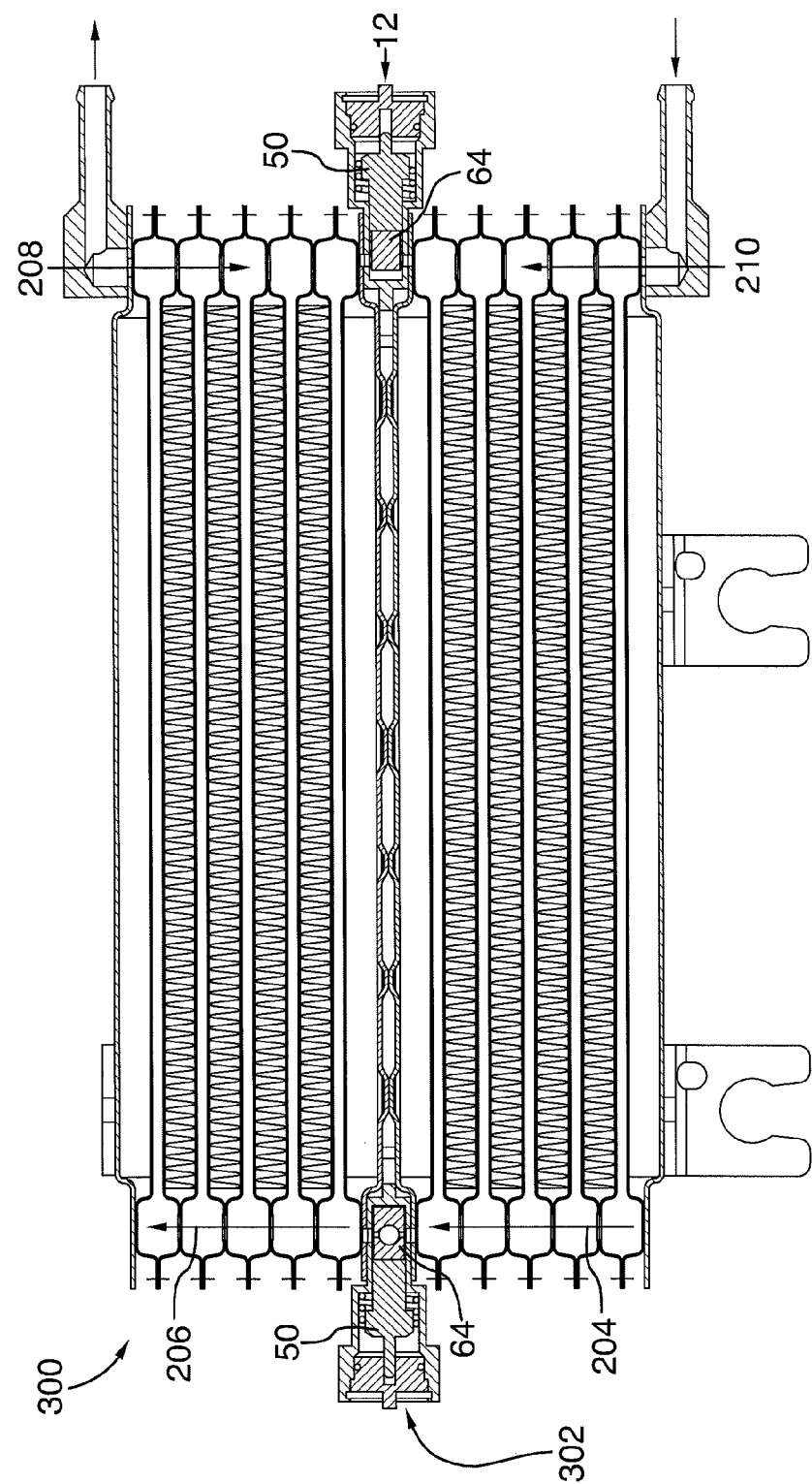
FIG. 16 is a side, partially schematic view of another embodiment of a heat exchanger according to the present invention, in a hot flow condition.
Figure 17:
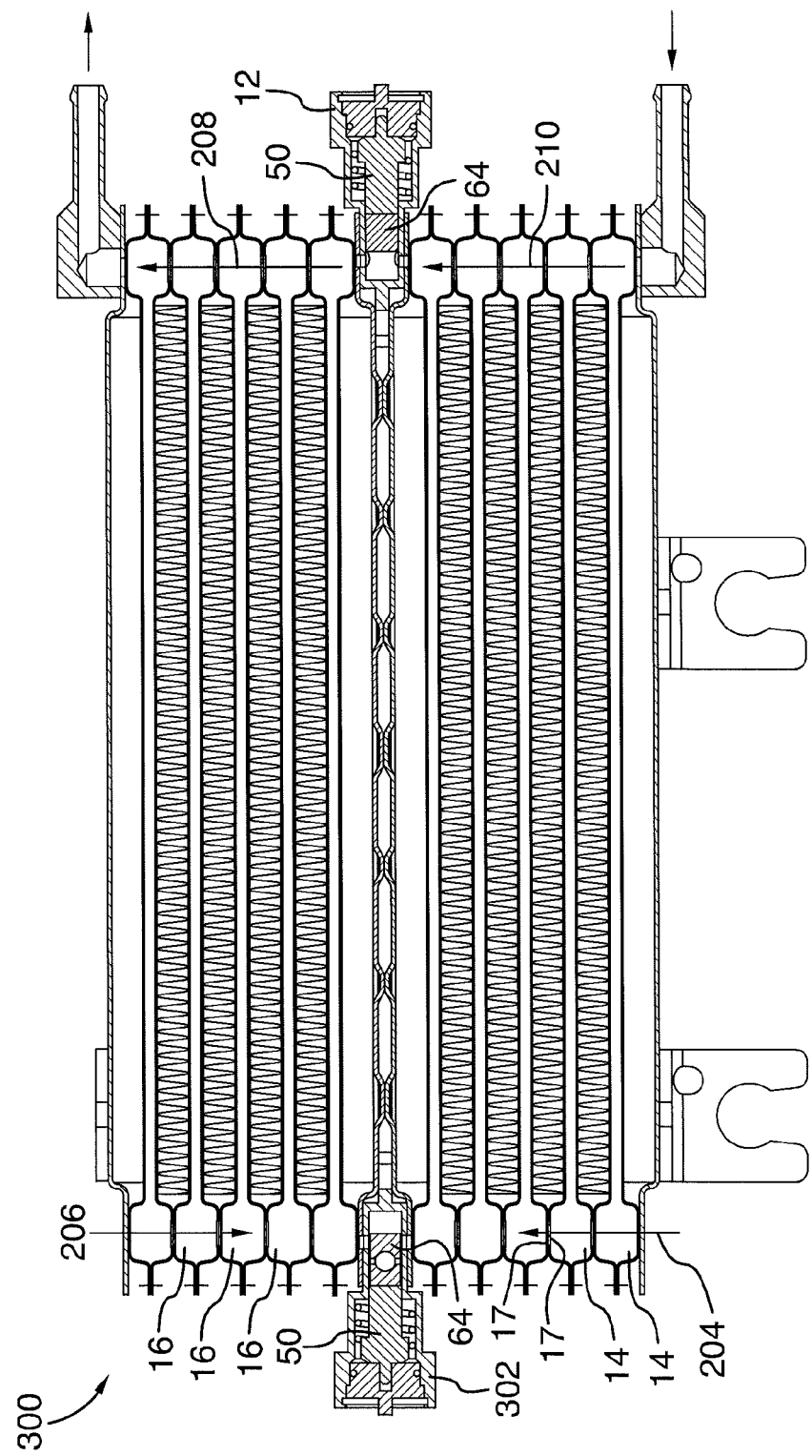
FIG. 17 is a view of the structure of FIG. 10 in a cold flow condition.

In this regard, it will be noted that the heat exchanger 300 of FIG. 16 differs in the presence of a further valve 302 interposed between the substacks, and more particularly, between manifolds 204,206 thereof. This further valve 302, which is constructed substantially identically to the bypass valve 12, is an anti-leakage valve. In this embodiment, the anti-leakage valve 302 and the bypass valve 12 are adapted such that, when the bypass valve 12 is blocked [thereby to arrest flow between manifolds 208,210], as shown in FIG. 16, the anti-leakage valve 302 is unblocked, and such that, when the bypass valve 12 is unblocked, as shown in FIG. 17, the anti-leakage valve 302 is blocked. It will be evident that this functionality is readily obtained by appropriate modifications to the respective temperature responsive actuators 50, which is a matter of routine to persons of ordinary skill in the art and accordingly is not discussed in detail.

Figure 18:
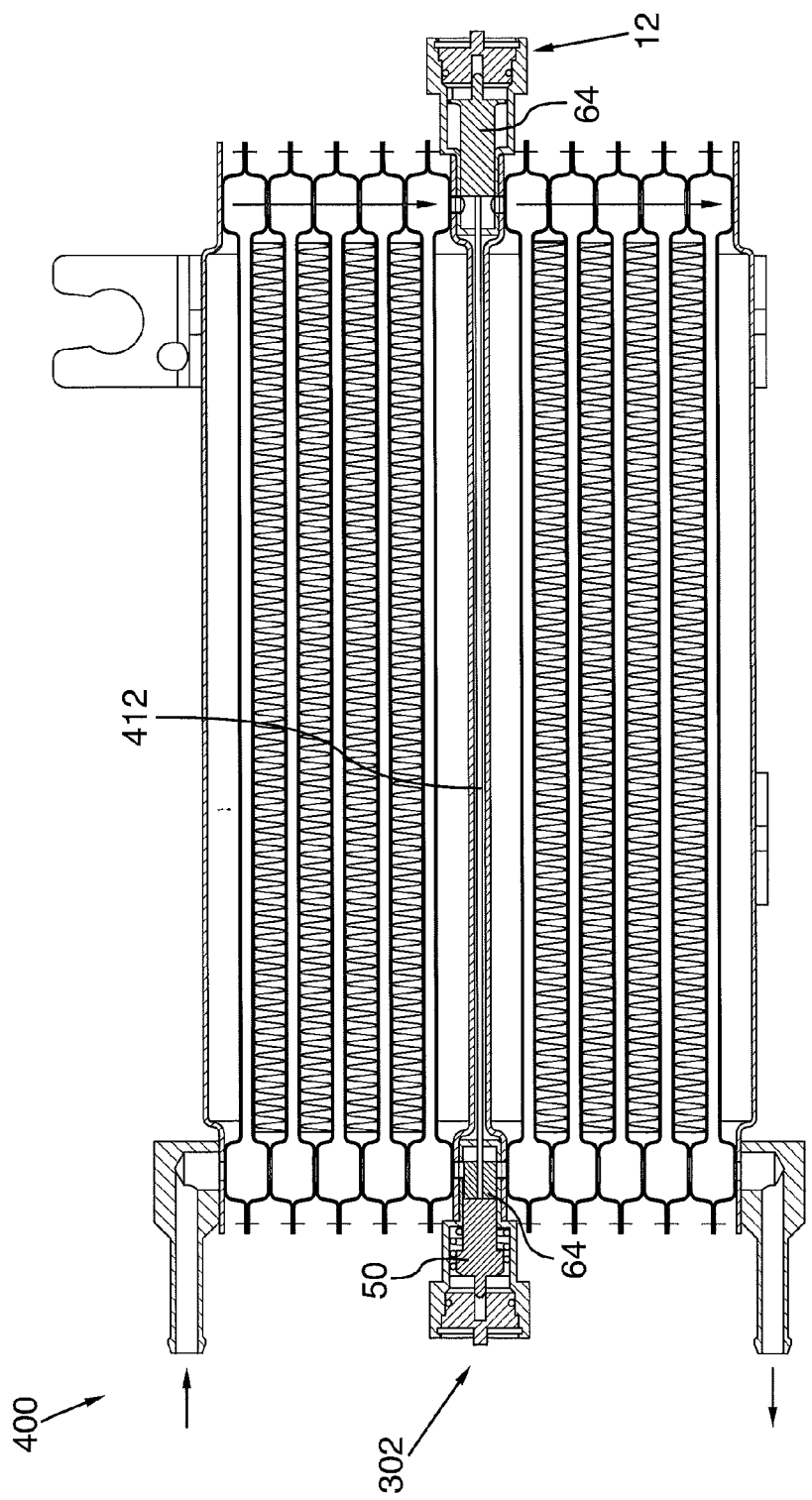
FIG. 18 is a side, partially schematic view of another embodiment of a heat exchanger according to the present invention, in a hot flow condition.
Figure 19:
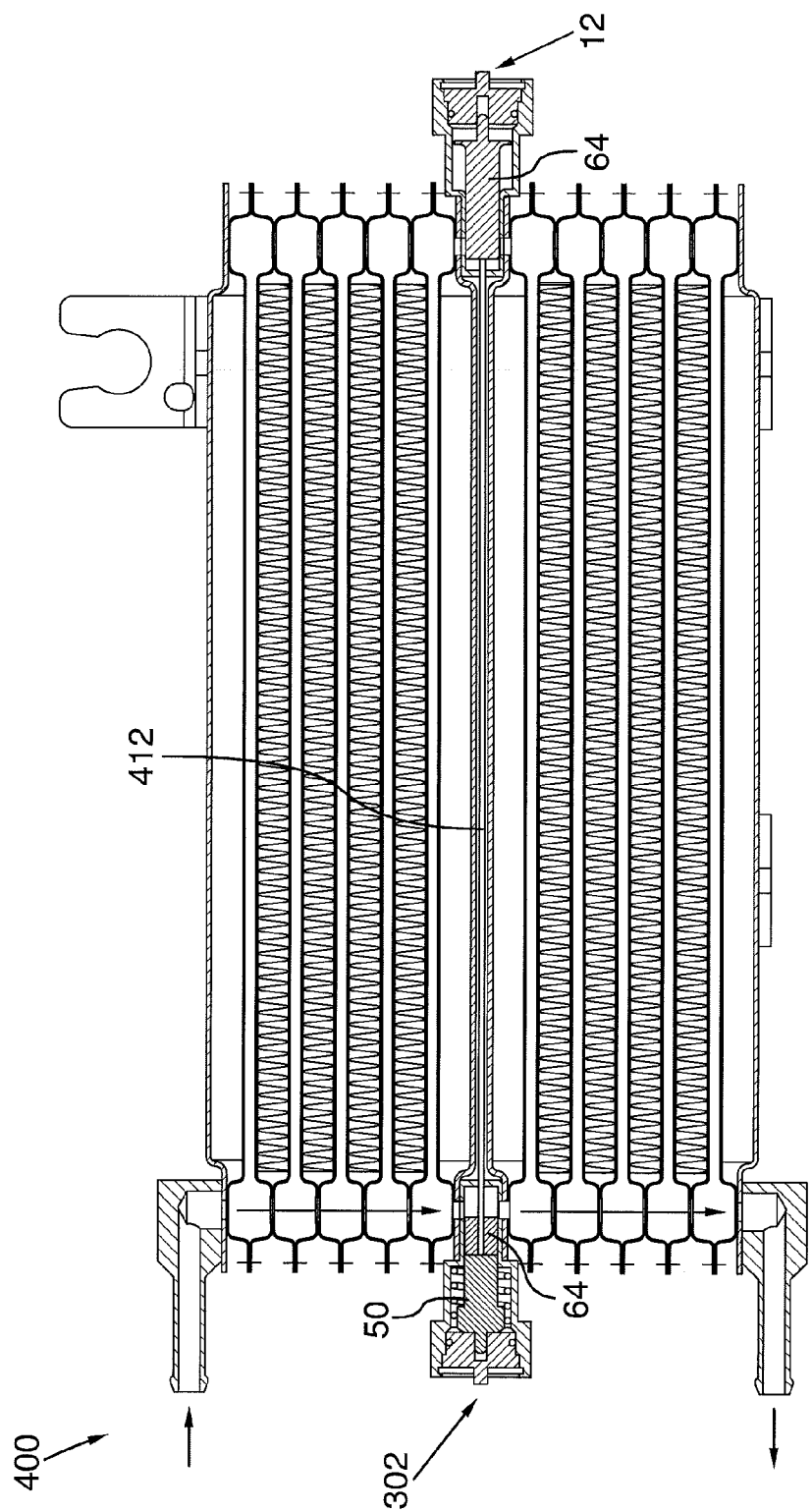
FIG. 19 is a view of the structure of FIG. 12 in a cold flow condition.

With respect to FIG. 18, this heat exchanger 400 should be understood to function in the same manner as that of FIGS. 16 and 17, but whereas the heat exchanger 300 of FIGS. 16 and 17 included a temperature responsive actuator 50, in the nature of a thermal motor, in each valve 12, 302, the heat exchanger 400 of FIGS. 18 and 19 includes only a single thermal motor 50, which actuates both plungers 64 by means of a connecting rod 412.

The advantage associated with the structure of FIGS. 16-19 is that this structure does not rely upon pressure drop imbalance to direct flow: in cold flow conditions, all of the fluid bypasses the tubes 14, whereas in FIG. 1, a portion of the flow traverses the tubes 14 even in bypass mode.

Having described exemplary embodiments of the invention, it will be appreciated that various modifications can be made to the structures described above. For example, instead of using a thermal motor or solenoid type actuator for the bypass valves, other devices could be used as well, such as a bimetallic helix to move the barrel or plunger of the valve. The tubular members can also have other shapes or configurations as well.

From the above, it will be appreciated that the valves of the present invention are in the form of plugs that can be plugged in at any desired location in the heat exchanger with a simple rearrangement of the location of some components. The valve housings actually act as a form of baffle plate to intermittently block flow between manifold portions of the heat exchangers. In fact, the valves could be plugged in anywhere in the heat exchangers where it is desired to have flow between the plate pairs or tubes. The valve housings are brazed in place along with all of the other heat exchanger components. The actual valve elements in the actuators are then removably or releasably located in the valve housings to complete the assembly. No external tubing or peripheral components are required to make the actuator valves active.

As will be apparent to those skilled in the art in the light of the foregoing disclosure, many alterations and modifications are possible in the practice of this invention without departing from the spirit or scope thereof. The foregoing description is of the exemplary embodiments and is by way of example only, and it is not intended to limit the scope of the invention, which should be understood as limited only by the accompanying claims, purposively construed.

The invention claimed is:

1. A heat exchanger comprising:
   a plurality of tubular members disposed in a stack, the tubular members having spaced-apart wall portions including flow openings for the flow of fluid between the tubular members;
   an anti-leakage valve including:
      a housing having a hollow plug portion with opposed plug walls, one of the plug walls having defined therein one of an inlet and an outlet opening, said plug portion further having defined therein the other of the inlet and outlet opening; said plug portion being disposed in the stack with the plug walls being sealingly mounted between selected ones of said spaced-apart wall portions to allow fluid flow between said inlet and outlet opening and respective flow openings in said selected ones of said spaced-apart wall portions;

an actuator portion located adjacent to the plug portion; and an actuator mounted in the actuator portion and having a plunger extending into the plug portion, the plunger reciprocating to block and unblock said one of the inlet and outlet opening, a bypass valve including:

a housing having a hollow plug portion with opposed plug walls, one of the plug walls having defined therein one of an inlet and an outlet opening, said plug portion further having defined therein the other of the inlet and outlet opening; said plug portion being disposed in the stack with the plug walls being sealingly mounted between selected ones of said spaced-apart wall portions to allow fluid flow between said inlet and outlet opening and respective flow openings in said selected ones of said spaced-apart wall portions;

an actuator portion located adjacent to the plug portion; and an actuator mounted in the actuator portion and having a plunger extending into the plug portion, the plunger reciprocating to block and unblock said one of the inlet and outlet opening wherein the tubular members are formed of plate pairs having enlarged distal end portions; and wherein the plungers of the bypass valve and the anti-leakage valve are coupled together by a rod, the rod defining one of the actuators.

2. A heat exchanger according to claim 1, wherein the stack includes a substack immediately above the anti-leakage valve and a substack immediately below the anti-leakage valve the enlarged distal end portions are joined together to form, at one end of the stack, adjacent manifolds, one of the manifolds being associated one with the substack above the anti-leakage valve and another of the manifolds being associated with the substack below the anti-leakage valve, the manifolds being fluidly coupled to one another via the bypass valve, so that fluid can flow between the manifolds when the flow through the bypass valve is unblocked at the other end of the stack, adjacent manifolds, one of the manifolds being associated one with the substack above the anti-leakage valve and another of the manifolds being associated with the substack below the anti-leakage valve, the manifolds being fluidly coupled to one another via the anti-leakage valve, so that fluid can flow between the manifolds when the flow through the anti-leakage valve is unblocked the anti-leakage valve and the bypass valve being adapted such that, when the bypass valve is unblocked, the anti-leakage valve is blocked, and such that, when the bypass valve is blocked, the anti-leakage valve is unblocked.

3. A heat exchanger according to claim 1, wherein, the other of the actuators is a temperature responsive actuator.

4. A heat exchanger according to claim 3, wherein the temperature responsive actuator is a thermal motor.

* * * * *